United States Patent [19]

Carnesi

[11] Patent Number: 5,337,634
[45] Date of Patent: Aug. 16, 1994

[54] LATERALLY ADJUSTABLE SOCKET WITH MEANS FOR PROVIDING VISIBLE INDICATION OF SOCKET OPERATING POSITION

[76] Inventor: Thomas Carnesi, 1410 Brett Pl., #140, San Pedro, Calif. 90732

[21] Appl. No.: 40,350

[22] Filed: Mar. 30, 1993

Related U.S. Application Data

[63] Continuation of Ser. No. 843,981, Apr. 30, 1992, abandoned.

[51] Int. Cl.$^5$ .............................................. B25B 13/18
[52] U.S. Cl. ........................................ 81/128; 279/65
[58] Field of Search ................. 81/128, 129, 112–116; 279/69, 70, 56, 48, 49, 65, 74

[56] References Cited

U.S. PATENT DOCUMENTS

| | | | |
|---|---|---|---|
| 1,288,154 | 12/1918 | Palmgren | 279/65 |
| 1,425,213 | 8/1922 | Palmgren | 279/69 |
| 4,663,999 | 5/1987 | Colvin | 81/128 |
| 4,892,016 | 1/1990 | Anderson | 81/128 |

*Primary Examiner*—D. S. Meislin
*Attorney, Agent, or Firm*—Irving Keschner

[57] ABSTRACT

A socket having a plurality of gripping jaws positioned in slots formed in a yoke member, the yoke member in turn being positioned in a cylindrically shaped barrel member. The barrel member has an index window which provides a visual indication to a user of the size of the socket opening. The jaws are positionable laterally inwardly or outwardly to provide seventeen discrete socket opening sizes without varying the external physical dimensions of the socket.

12 Claims, 3 Drawing Sheets

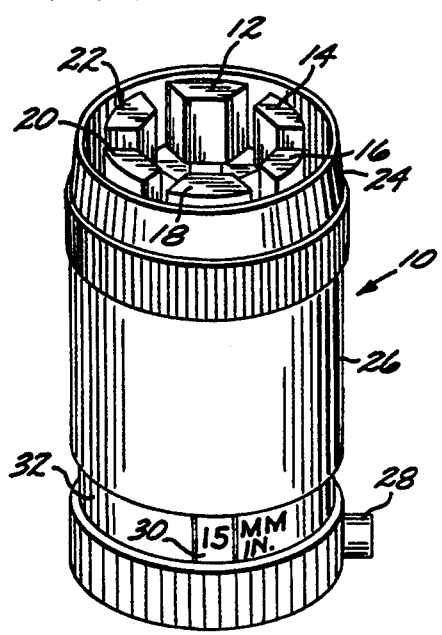
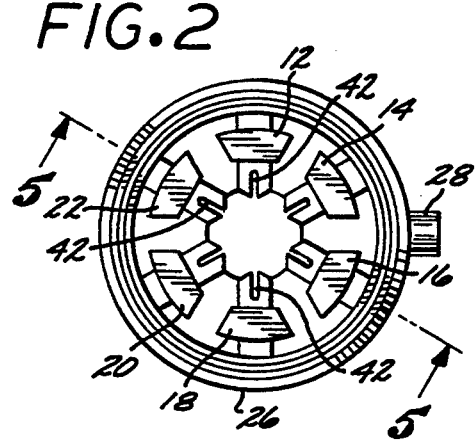
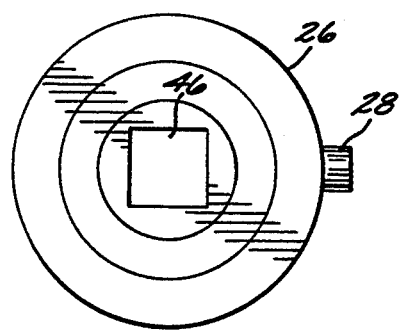
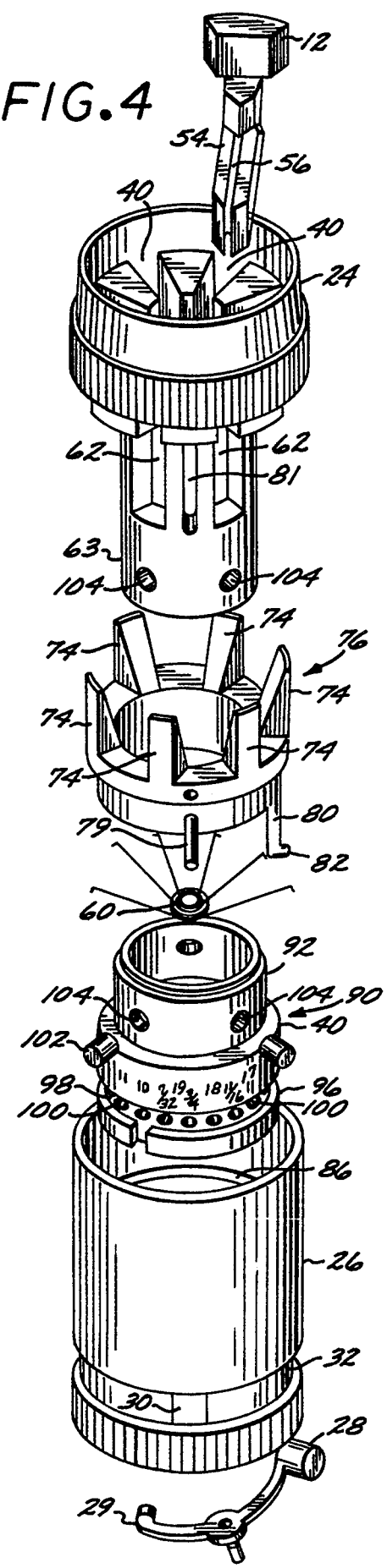

LATERALLY ADJUSTABLE SOCKET WITH MEANS FOR PROVIDING VISIBLE INDICATION OF SOCKET OPERATING POSITION

CROSS-REFERENCE TO RELATED APPLICATION

This is a continuing application of application Ser. No. 843,981 filed Apr. 30, 1992, now abandoned.

BACKGROUND OF THE INVENTION

1. Field of the Invention

The present invention provides a socket which includes gripping jaw members that are laterally positionable to engage a work piece, such as a bolt or nut and which provides a visible indication of the size of the socket opening to a user.

2. Description of the Prior Art

A number of prior art tool devices are currently available wherein the dimension of the work piece gripping members are changeable by simply rotating the component which houses the gripping members. For example, U.S. Pat. No. 4,608,887 to Colvin discloses an adjustable socket with a three jaw configuration. The jaws taper outwardly or inwardly radially and are controlled by a threaded driver, a knurled collar locking the jaws in position. When adjusted to its smaller sizes, the socket becomes progressively longer which can present problems in small working spaces. In addition, Colvin's socket is not calibrated, thus preventing a user from determining the size of the socket opening and making it more difficult for the user to adjust to the correct size in the case that initial installation is interrupted or an installed bolt or nut is to be removed at a later date.

What is thus desired is to provide a socket which does not change overall dimensions as it is adjusted for rotational driving of nuts or bolts and also provides a visual indication of the size of the socket opening to the user.

SUMMARY OF THE PRESENT INVENTION

The present invention provides a socket which has gripping jaws that move laterally during their size adjustment, thus not increasing the overall size dimension of the socket and which also provides a visual indication to a user of the position of the jaws, or the size of the socket opening, which corresponds to the size of a bolt or nut to be engaged by the socket.

The socket comprises an outer barrel member having a knurled portion and a transparent window area, a drive coupling having inch and metric markings formed on a cylindrical portion, a cam ring and a yoke.

An arm formed on a cam ring has an end member that rides through a spiral groove in the barrel in a first embodiment; in a second embodiment, a separate cam sleeve is positioned inside the barrel. Six tapered arms equally spaced are provided on the cam ring; these arms are in constant contact with six gripping jaws, which are inserted into six equally spaced slots in the yoke. Both the cam ring and six jaws share the same angular taper for efficiency. The cam ring slides upward (when rotated counter clockwise), pushing the six jaws equally inward. When the cam ring slides downward (rotated clockwise), the six jaws are released outward. This is achieved by three return springs which are set between the center groove of the jaws. The cam ring fits over the shaft part of the yoke and is guided by a pin that slides up and down within a vertical slot in the cam ring. The pin fits into a hole in the yoke shaft. This feature prevents the cam ring from rotating in the barrel. The socket has sixteen settings with a total of seventeen size variations in both metric and inch. The spiral groove in the barrel in the first embodiment and the cam sleeve in the second embodiment, provides the height variation that regulates the socket's size settings. This socket accommodates both metric and inch settings which are marked on the drive coupling and are viewed through the small indicator widow on the barrel. The coupling is assembled onto the yoke assembly by press fitted dowel pins. The drive coupling has a groove equally spaced for size indexing. Each size graduations are in line with the index holes, and are held secure by a spring-loaded release lever.

The yoke assembly fits into the barrel assembly and is held together as a unit by a set screw that is locked into the drive coupling groove. The drive coupling has a square slot which accepts a universal drive hand ratchet for general use.

When holding the top knurled part of the adjustable socket and, at the same time, compressing the release lever located at the lower knurled part of the socket barrel, the desired sizes, which are indicated through a small window at the barrel groove, can be set. Rotation of the socket clockwise increases the size; counter clockwise rotation reduces the size. Either rotation causes the cam ring to slide upwards or downwards.

DESCRIPTION OF THE DRAWING

For a better understanding of the invention as well as other objects and further features thereof, reference is made to the following description which is to be read in conjunction with the accompanying drawing wherein:

FIG. 1 is a perspective view of a first embodiment of the socket of the present invention, the socket being set to a specific opening size;

FIG. 2 is a top view of the socket shown in FIG. 1;

FIG. 3 is a bottom view of the socket shown in FIG. 1;

FIG. 4 is an exploded assembly view of the socket shown in FIG. 1;

DESCRIPTION OF THE INVENTION

Figure 5:
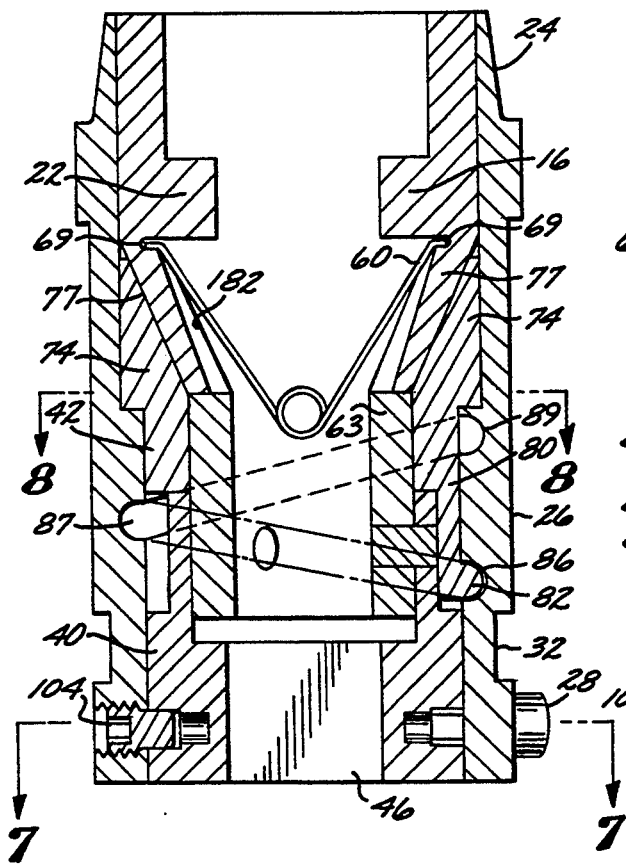
FIG. 5 is a sectional view along line 5—5 of FIG. 2 showing the jaws at the maximum opening.

Referring now to FIG. 1, a perspective view of the socket 10 of the present invention is illustrated. Visible in this figure are six jaw members 12, 14 . . . 22, equally spaced in a radial location, knurled yoke 24 and barrel 26 and release lever 28. Also illustrated is an index window 30, formed in notch portion 32 of barrel 26, the window 30, covered by a transparent material, allowing a user to see indicia formed on a drive coupling (see FIG. 4). The indicia correspond to the setting of jaw meters 12, 14 . . . 22 which in turn corresponds to the desired socket opening size.

FIG. 2 is a top view of the socket shown in FIG. 1 and shows the six jaws 12, 14 ... 22 equally spaced in a radial direction and positioned in slots 40 (see FIG. 4) formed within the upper portion of yoke 24. Each jaw has a slot 42 formed therein adapted to receive the ends of a bias spring as will be described hereinafter.

FIG. 3 is a bottom view of the socket shown in FIG. 1 and illustrates square slot 46 which accepts, for example, a ⅜ drive universal hand ratchet (not shown) to adjust the socket opening size.

FIG. 4 is an exploded view of the socket of the present invention illustrating the components thereof in more detail. As can be seen, jaw member 12 (the five other jaw members 14, 16 ... 20, and not illustrated but have an identical construction) comprise an upper bolt gripping head portion 52 and a slotted angular lower portion 54. Slot 56 in portion 54 receives one lead arm of a torsion return spring bias 60 (actually three nested springs with six total lead arms) for reasons to be set forth hereinafter. The ends of the lead arms of the nested springs fit into a small horizontal hole 69 drilled into each jaw 12. The angled lower portion 54 is selected to correspond to the taper of the six arms 74 formed on cam ring 76. The bottom portion of yoke 24 has six equally spaced openings 62 (only two shown) through which arms 74 of cam ring 76 can engage the rear surface 77 of lower portion 54 of each jaw member 12. The lower portion of cam ring 76 has an arm 80 with a spherical ball 82 attached to the bottom thereof, ball 82 adapted to follow spiral groove 86 formed on the inner surface of barrel 26.

Drive coupling 90 has an upper apertured portion 92, a middle indicia marked portion 94, a split cylindrical portion 96 and a portion 98 intermediate portions 94 and 96 having sixteen equally spaced holes 100 formed around the periphery thereof.

Figure 6:
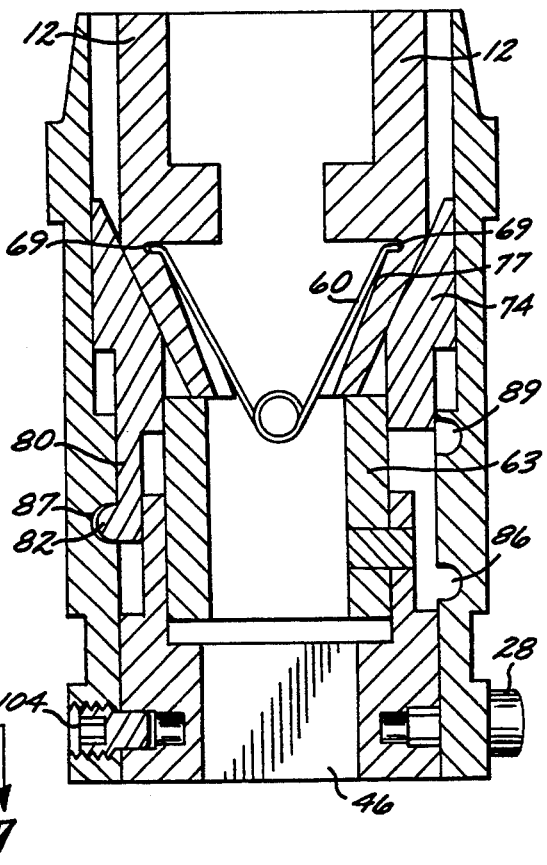
FIG. 6 is a sectional view showing the jaws at an intermediate opening.

The operation of the socket 10 of the present invention, with specific reference to FIGS. 5 and 6, is as follows:

The desired size of the socket opening is set by holding the top knurled part of the socket and, at the same time, compressing the release lever 28 located at the lower knurled part of the socket barrel 26. The desired sizes are indicated through window 30 at the barrel groove. Rotation of the socket clockwise increases the size of the opening, counter clockwise rotation reduces the size. Either rotation causes the cam ring 76 to slide upwards or downwards. Arm 80 of cam ring 76 has a spherical ball 82 that rides through spiral groove 86 in the barrel. The six tapered arms 74 equally spaced on the cam ring are in constant contact with the six jaws 12 which are positioned into six equally spaced slots 40 in the yoke 24. The cam ring 76 and the six jaws 12 preferably have the same angular taper. The cam ring 76 slides upward (when rotated counter clockwise), pushing the six jaws 12 equally inward. When the cam ring slides downward (rotation clockwise), the six jaws 12 are released outward by three tension return springs 60 which are set between the center groove of the jaws 12.

The cam ring 76 fits over the shaft part 63 of yoke 24 with a small diametrical clearance and is guided by a pin 79 that slides up and down slot 81 in yoke shaft 63. This feature prevents the cam ring 74 from rotating in the barrel. The socket has sixteen settings with a total of seventeen size variations in both metric and inch. However, because both the 19 mm and ¾ inch sizes are virtually the same, with a difference of only 0.002 inch, both sizes are incorporated into one setting. The height variation of spiral groove 86 in the barrel is the height variation that regulates the socket's size settings. The socket 10 is designed to accommodate both metric and inch settings which are graduated on the drive coupling and are viewed through the small indicator window 30 on the barrel. Drive coupling 90 is assembled onto the yoke 24 by three dowel pins 102 (only two shown), press fitted into holes 104 and spaced 120 degrees. Drive coupling 90 has a groove 98, sixteen equally spaced holes 100 being formed within the groove 98 for size indexing. Each size graduations are in line with the index holes, and are held secure by spring-loaded release lever 28.

The yoke assembly 24 fits into the barrel assembly 26, and is held together as a unit by set screw 104 that is locked into the drive coupling groove 98. The drive coupling 90 has a square slot which accepts a universal drive hand ratchet for general use.

The yoke assembly, for definition purposes, comprises drive coupling 90, cam ring 76, jaw members 12, contact springs 60, guide pin 79, and assembly pins 102.

FIG. 5 illustrates the jaws member 12 set to provide the maximum socket opening (19 millimeters, ¾ inch), the spherical ball 82 being in the lowest point of groove 86 (two intermediate points of groove 86 are noted by reference numerals 87 and 89). FIG. 6 illustrates the situation when rotation of the barrel has caused cam ring 76 to slide upward, spherical arm riding up within groove 86 such that it assumes the groove position 87, the jaw members 12 being moved laterally inward, the socket opening being reduced in size.

Figure 7:
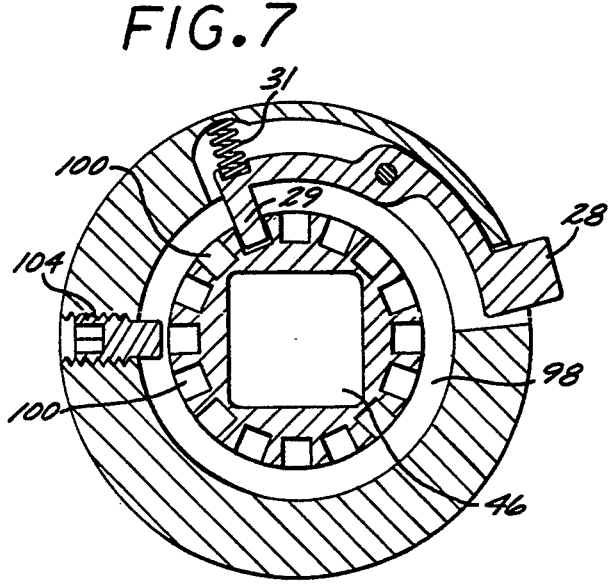
FIG. 7 is a sectional view along line 7—7 of FIG. 5.
Figure 8:
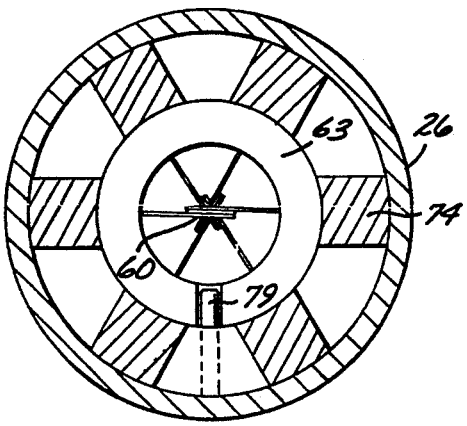
FIG. 8 is a sectional view along line 8—8 of FIG. 5.

FIG. 7 shows index release lever 28 in more detail with end 29 biased by spring 31 into a selected one of holes 100. Retainer screw 104 is also shown engaging groove 94 of drive coupling 90.

Figure 9:
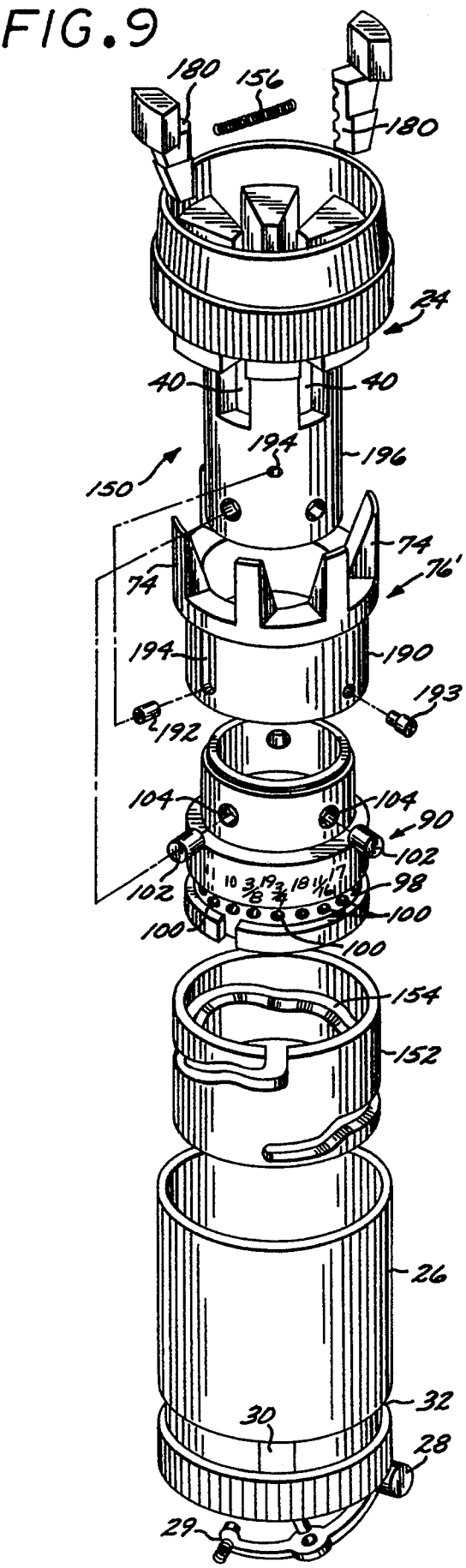
FIG. 9 is an exploded assembly view of a second embodiment of the socket of the present invention.
Figure 10:
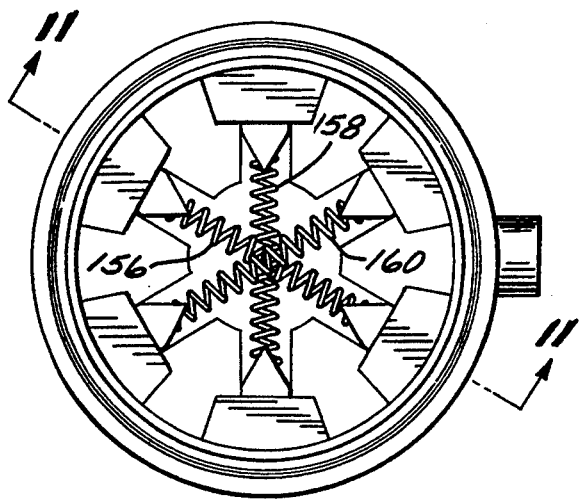
FIG. 10 is a top view of the socket shown in FIG. 9.

FIG. 9 is an exploded view of a second embodiment of the socket of the present invention. Socket 150 differs from socket 10 in the following respects:

1. A separate cam sleeve 152 having a spiral groove 154 is fused to the internal diameter of barrel 26 and replaces the spiral groove 86 (FIG. 4) formed directly on the inside surface of barrel 26 in socket 10, reducing fabrication cost and complexity.

2. Three compression springs 156, 158 and 160 are used to release (bias) the socket jaws 170, 172 and 174 (although only three jaw members are illustrated, six such members are in fact utilized) outwardly when cam ring 76 slides downward instead of the torsion springs 60 used in socket 10. Compression type springs have an advantage over the torsion type springs due to their cost effectiveness and efficiency in operation. In particular, compression type springs are standard shelf items whereas the torsion type springs for a specific application have to be custom made at a much higher cost and may have a tendency to bind when the three are nestled within each other in the embodiment shown in FIGS. 1–8.

3. Jaws 170, 172 and 174 have solid portions 180 instead of the channel portions shown in socket 10 to improve torque stability and simplify the fabrication process. Holes 182 are provided at the mid-point of the interior jaw surface to receive the spring ends. The jaw edges are chamfered at an approximately 60 degree angle to provide clearance when the six jaw members meet at the minimum ⅜ inch opening.

4. Cam ring 76' is modified to incorporate a longer cylindrical portion 190 and, in lieu of cam arm 80, incorporates a cam ring guide pin 192 which is press fitted into hole 194 formed in yoke 24.

The operation of the socket 150 of the present invention is as follows:

The desired size of the socket opening is set by holding the top knurled part of the socket and, at the same time, compressing the release lever 28 located at the lower knurled part of the socket barrel 26. The desired sizes are indicated through window 30 at the barrel groove. Rotation of the socket clockwise increases the size of the opening, counter clockwise, rotation reduces the size. Either rotation causes the cam ring 76' to slide upwards or downwards. Pin 193 rides through spiral groove 154 in the cam sleeve 152. The six tapered arms 74 equally spaced on the cam ring 26 are in constant contact with the six jaws 180 which are positioned into six equally spaced slots 40 in the yoke 24. The cam ring 76' and the six jaws 180 preferably have the same angular taper. The cam ring 76' slides upward (when rotation counter clockwise), pushing the six jaws 180 equally inward. When the cam ring 76' slides downward (rotation clockwise), the six jaws 180 are released outward by the three compression return springs 156, 158 and 160 which are positioned in holes 182 formed in jaws 180.

The cam ring 76' fits over the shaft part 196 of yoke 24 with a small diametrical clearance and is guided by a pin 192 that slides up and down slot 194 in yoke shaft 196. This feature prevents the cam ring 76' from rotating in the barrel. The socket has sixteen settings with a total of seventeen size variations in both metric and inch. However, because both the 19 mm and ¾ inch sizes are virtually the same, with a difference of only 0.002 inch, both sizes are incorporated into one setting. The height variation of spiral groove 154 in the cam sleeve 152 is the height variation that regulates the socket's size settings. The socket 150 is designed to accommodate both metric and inch settings which are graduated on the drive coupling and are viewed through the small indicator window 30 on the barrel 26. Drive coupling 90 is assembled onto the yoke 24 by three dowel pins 102 (only two shown), press fitted into holes 104 and spaced 120 degrees. Drive coupling 90 has a groove 98, sixteen equally spaced holes 100 being formed within the groove 98 for size indexing. Each size graduations are in line with the index holes, and are held secure by spring-loaded release lever 28.

The cam sleeve 152 is fused to the internal diameter of barrel 26 and the yoke assembly 24 is then fitted into the barrel assembly 26, and is held together as a unit by set screw 104 that is locked into the drive coupling groove 98. The drive coupling 90 has a square slot which accepts a universal drive hand ratchet for general use.

The yoke assembly, for definitional purposes, comprises drive coupling 90, cam ring 76', jaw members 150, springs 156, 158 and 160, guide pin 192 and assembly pins 102.

Figure 11:
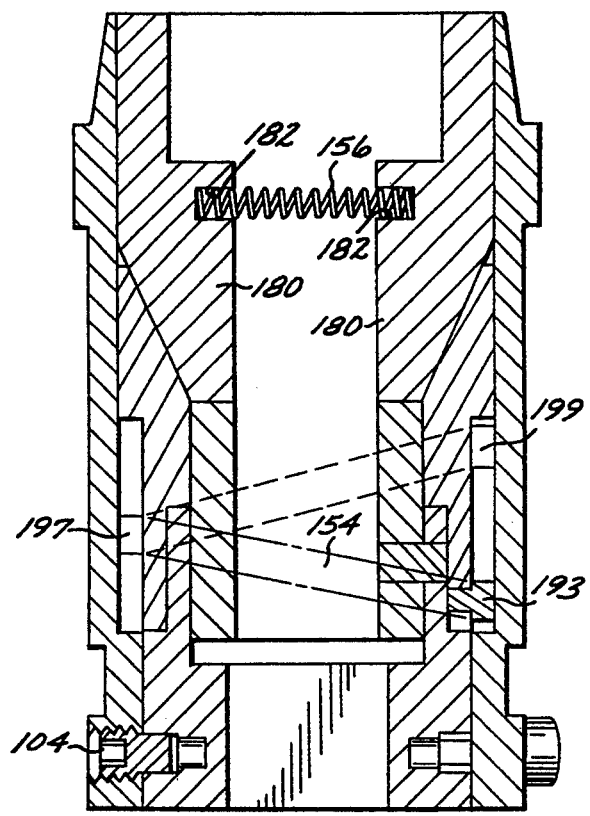
FIG. 11 is a sectional view along line 11—11 of FIG. 10 showing the jaws at the maximum opening.

FIG. 11 illustrates the jaws member 180 set to provide the maximum socket opening (19 millimeters, ¾ inch), the cam ring guide pin 193 being in the lowest point of groove 154 (two intermediate points of groove 154 are noted by reference numerals 197 and 199).

The present invention thus provides an improved adjustable socket wherein its lateral jaw design enables the external dimensions of the socket, particularly the length, to remain the same at every socket size, thus enabling the socket to be utilized in normally inaccessible locations. In addition, when the desired size is set in position for operation, the metric or standard numerical value can be read easily through the window opening in the barrel.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. An adjustable socket having a longitudinal axis comprising:
    a plurality of jaw members movably positioned within slots formed in a first member; each fixed position of the jaw members corresponding to a selected socket size opening;
    a second member having an opening therein for receiving said first member, said second member having a plurality of vertically extending members which engage an adjacent one of said jaw members; said second member having a follower arm member associated therewith;
    a third member having a plurality of indicia formed thereon corresponding to the size of the adjusted socket opening; said third member having a plurality of openings adjacent said indicia markings; and
    a fourth member for receiving said third member, the inner surface of said fourth member having a spiral groove into which the follower arm of said second member travels, said fourth member having an opening to allow a user to view selected ones of said indicia as the opening of said socket is adjusted.

2. The adjustable socket of claim 1 further including a spring biased release lever, one end of said lever being positionable in one of said openings in said third member to fixedly maintain said socket opening to a size corresponding to that opening.

3. The socket of claim 1 wherein rotation of said fourth member causes said follower arm to travel within said spiral groove, said second member moving either in a first or second direction along said socket longitudinal axis in response thereto.

4. The socket of claim 3 wherein said vertically extending members apply force to said corresponding jaw members when said second member moves in a first direction whereby said jaw members are moved laterally towards said socket longitudinal axis.

5. The socket of claim 4 further including resilient means positioned within said socket and coupled to said jaw members whereby said jaw members are maintained in contact with said vertically extending members when said second member moves in said second direction.

6. The socket of claim 1 further including means extending through the outside surface of said fourth member to secure said fourth member to the third member received therein.

7. An adjustable socket having a longitudinal axis comprising:
    a plurality of jaw members movably positioned within slots formed in a first member; each fixed position of the jaw members corresponding to a selected socket size opening;

a second member having an opening therein for receiving said first member, said second member having a plurality of vertically extending members which engage an adjacent one of said jaw members; said second member having a follower pin associated therewith;

a third member having a plurality of indicia formed thereon corresponding to the size of the adjusted socket opening; said third member having a plurality of openings adjacent said indicia markings; and a fourth member having a spiral groove formed thereon and secured to the inner surface of a fifth member, said third member being positioned within said fourth member; the follower pin of said second member travelling within said spiral groove, said fifth member having an opening to allow a user to view selected ones of said indicia as the opening of said socket is adjusted.

8. The adjustable socket of claim 7 further including a spring biased release lever, one end of said lever being positionable in one of said openings in said third member to fixedly maintain said socket opening to a size corresponding to that opening.

9. The socket of claim 7 wherein rotation of said fourth member causes said follower pin to travel within said spiral groove, said second member moving either in a first or second direction along said socket longitudinal axis in response thereto.

10. The socket of claim 9 wherein said vertically extending members apply force to said corresponding jaw men%bets when said second member moves in a first direction whereby said jaw members are moved laterally towards said socket longitudinal axis.

11. The socket of claim 10 further including resilient means positioned within said socket and coupled to said jaw members whereby said jaw members are maintained in contact with said vertically extending members when said second member moves in said second direction.

12. The socket of claim 7 further including means extending through the outside surface of said fifth member to secure said fifth member to the third member positioned within said fourth member.

* * * * *